United States Patent Office 2,990,232
Patented June 27, 1961

2,990,232
FLAME RESISTANT CELLULOSE DERIVATIVES
Eugene Pacsu and Robert F. Schwenker, Jr., Princeton, N.J., assignors to Textile Research Institute, Princeton, N.J., a corporation of New Jersey
No Drawing. Filed Dec. 31, 1956, Ser. No. 631,411
10 Claims. (Cl. 8—116)

This invention relates to methods for imparting flame resistant properties to cellulose and is directed particularly to methods wherein cellulose is chemically modified to produce new cellulose derivatives which are relatively non-flammable.

It has been usual practice heretofore to treat cellulose fabrics, paper and the like with additive compositions which when mechanically affixed to the fibers of the material serve to render the product more or less flame resistant. However, such added agents frequently are removed on laundering or upon contact with moisture and some of them have a tendency to weaken or impair the physical properties of the material treated. Moreover, the weight or loading of the product is generally high, amounting to from 20% to 100% or more. No commercially successful methods of the prior art are known which have served to modify the cellulose chemically for the purpose of rendering it flame resistant.

Investigations into the mechanism for the thermal decomposition of cellulose suggest that the initial step in breaking down of the cellulose involves the formation of the l-glucose anhydride known as levoglucosan as an intermediate product which is then decomposed to form flammable decomposition products.

In accordance with the present invention the cellulose macromolecule is modified chemically and in such a way as to prevent the formation of levoglucosan. The modified cellulose products thus obtained are new derivatives which are characterized by their flame resisting properties.

In a preferred method embodying the present invention the cellulose is subjected to treatment for effecting preferential esterification of the hydroxyl of the primary alcohol group in the 6 position of the glucose anhydride unit of the cellulose. Thereafter at least a portion of the esterified groups are reacted with metallic halides to introduce a halogen into the cellulose molecule. In this way new flame resistant products are produced. The esterification is preferably accomplished by the use of an organic sulfonyl chloride in the presence of a suitable tertiary amine, such as pyridine for example. Thus methanesulfonyl chloride, hereafter referred to as mesyl chloride, may be employed and in the alternative, p-toluenesulfonyl chloride, hereafter referred to as tosyl chloride, may be used. Reactions wherein these agents have been employed in treating cellulose acetate have heretofore been described by Wolfrom J.A.C.S., vol. 63, p. 1688 (1941) and by Cramer and Purves J.A.C.S., vol. 61, p. 3458 (1930). However, the methods of the prior art have not been used in treating cellulose itself and are not applicable to the treatment of fabricated products such as textiles, paper, films and the like, which are formed of or contain cellulose.

While the introduction of iodine into an esterified cellulose acetate molecule in pyridine solution was apparently accomplished by Cramer and Purves, the present invention involves a substitution reaction involving mesylated cellulose and is preferably carried out in an aqueous medium whereby not only iodine but any other halogen can be introduced into the molecule. Moreover, the use of an aqueous medium in effecting the substitution of halogen for the —OSO$_2$R group renders it possible to control the reaction so as to avoid degradation of the cellulose or impairment of the physical properties of the material treated.

The products thereby obtained may be, for example, mesyl-6-halo-cellulose derivatives, tosyl-6-halo-cellulose derivatives or the like, which are characterized by their low flammability.

The methods of the present invention are characterized by the fact that they are of general application and may be used in treating woven and non-woven fabrics, cellulose fibers, viscose rayon, cuprammonium rayon, cotton linters, paper pulp, paper making fibers, bast and leaf fibers such as flax, sisal and hemp, and substantially any cellulose or cellulose containing material. Moreover, the process may be controlled so that the physical properties of the material treated are not impaired, whereas the loading or increase in weight of the treated material is limited. Furthermore, the methods of the present invention may be combined with other methods of treating cellulosic materials such as that described in our compending application Serial No. 631,508, filed Dec. 31, 1956. If desired the modified cellulose products of the present invention also may be treated to effect the addition of other flame retardants or agents thereto or to impart other properties to the treated material as in bleaching, dyeing or finishing fabrics.

The principal object of the present invention is to reduce the flammability of cellulosic materials.

Another object of the invention is to chemically alter the composition of cellulose to produce relatively flame resistant cellulose derivatives.

A further object of the invention is to provide methods whereby any halogen atom desired can be introduced into the cellulose molecule.

Another object of the invention is to provide methods whereby woven or otherwise fabricated cellulose products can be treated so as to convert the cellulose in situ into a less flammable derivative.

A specific object of the invention is to provide methods for effecting the introduction of any halogen desired into cellulose which has been selectively esterified in the 6 position of the glucose anhydride unit of the cellulose chain.

These and other objects and features of the present invention will appear from the following description thereof wherein typical methods of procedure and typical compounds are described for the purpose of indicating the general nature of the invention and preferred embodiments thereof but without intending to limit the scope of the invention thereby.

In order to reduce the flammability of cellulose in accordance with the present invention the primary alcohol group at the 6 position of the glucose anhydride unit of the cellulose chain is modified in character to prevent or reduce the formation of levoglucosan as a thermal decomposition product of the cellulose. The cellulose is therefore selectively esterified by means of an organic sulfonyl chloride to produce units which may be represented by the formula

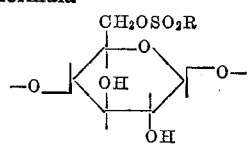

wherein R represents a hydrocarbon radical, preferably methyl or p-tolyl. However, other hydrocarbon sulfonyl chlorides may be used such as ethylsulfonyl chloride, isopropylsulfonyl chloride, phenylsulfonyl chloride, benzylsulfonyl chloride and the like.

The reaction is carried out in the presence of a tertiary base such as pyridine, lutidine, quinoline or the like, although for reasons of economy, pyridine is preferred. The reaction is believed to proceed as indicated in the following typical equations wherein mesyl chloride is used.

The mesyl chloride first reacts with the pyridine to form a complex according to the equation

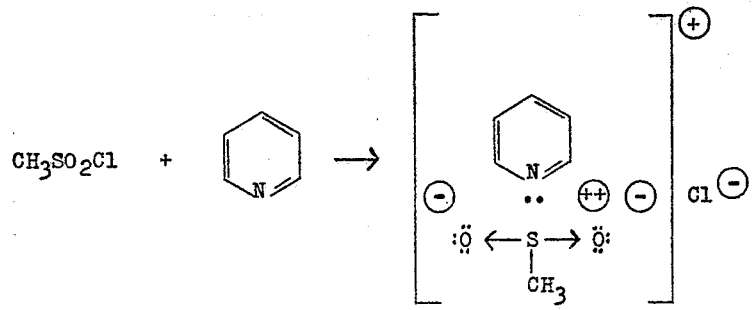

The pyridinium complex then reacts primarily with the labile hydrogen of the primary alcohol group of the glucose anhydride unit of cellulose to yield a 6-mesyl cellulose according to the equation

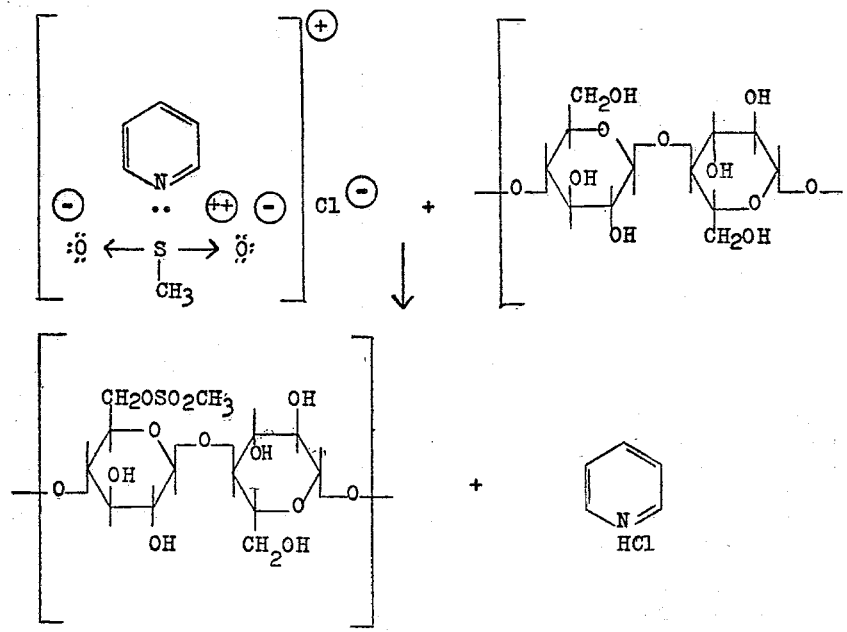

The esterification is promoted or rendered easier if the cellulose is first given a preliminary treatment. Thus it is preferable to mercerize or swell the cellulose by treatment with alkali although mere wetting out of the material with water is helpful. In any event the esterification is largely selective for the hydroxyl part of the primary alcohol group in the 6 positions of the glucose anhydride unit of the cellulose chain. Nevertheless, some esterification may occur in the 2 and 3 positions, particularly if the reaction is prolonged. This is indicated by the fact that samples which are subjected to prolonged treatment have been found to have a sulfur content exceeding that represented by complete esterification at the 6 position of the glucose anhydride unit.

The esterified cellulose obtained in accordance with the foregoing reaction exhibits limited but improved flame resistance and flow resistance which increases with the degree of esterification.

It is therefore generally desirable to subject the esterified cellulose to further treatment to increase the flame retardant properies thereof. This can be accomplished by subjecting the esterified material to treatment in accordance with prior art methods to affix flame retardants to the esterified cellulose fibers in which case the amount of added agents required to attain the desired flame resistance is substantially less than when treating unesterified cellulose.

In the alternative, and in the preferred practice of the present invention, the selectively esterified cellulose is subjected to a further chemical treatment to replace a part or all of the —OSO₂R groups by halogen as in he equation

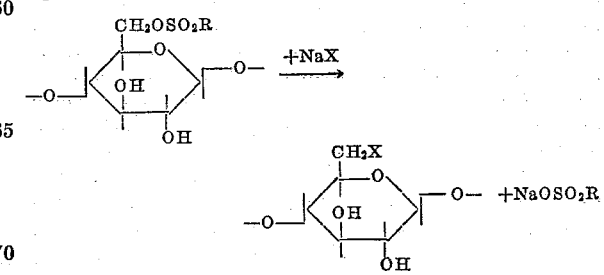

where X is Br, I, Cl, or F.

Sodium iodide is the only halogen salt which is known to be readily soluble in organic solvents and since such replacement reactions have always been carried out heretofore in the presence of organic solvents, it has not been possible to introduce any halogen other than iodine into the cellulose molecule by such reactions. In contrast, the present invention preferably involves a replacement reaction of the type described which is carried out in an aqueous medium. In this way any water soluble halogen salt can be used and it is possible to introduce bromine, chlorine or fluorine as well as iodine into the molecule. Moreover, the aqueous treatment renders it possible to control the process so as to reduce or prevent degradation of the cellulose or impairment of its physical properties. The importance of bromine and iodine as flame retarding substituents is of particular significance, although chlorine and fluorine may be introduced and are helpful to some extent and in some instances.

The extent to which the substitution by the halogen takes place may be varied by control of the aqueous treatment. The final product usually contains some remaining —$OSO_2R$ groups and in fact when iodine or bromine are the substituting halogens, but few replacements need be made in order to produce a marked increase in the flame retarding properties of the material. Nevertheless, substantially complete substitution by the halogen can be effected and is generally preferred so that, in most instances, only a small amount of sulfur is present in the halogenated product.

In order to eliminate after-glow in the burned product, phosphorus may be introduced into the molecule as described in our copending application Serial No. 631,508 referred to above. It is found that only very small amounts of phosphorus are required for this purpose.

When the replacement reaction is carried out in an aqueous medium it appears that various side reactions of an unknown nature take place which tend to result in degradation of the cellulose. However, by controlling the pH value of the aqueous solution such degradation can be prevented or controlled so as to obtain end products which possess substantially the same tensile strength as the original cellulose material treated. The pH value should be maintained in the neighborhood of 7 and for this purpose a suitable buffer solution or solid barium carbonate or the carbonate of an alkali-metal or an alkaline earth metal may be used.

The products resulting from the introduction of halogen, with or without phosphorus, into the cellulose molecule at the 6 position are characterized by remarkable flame resistance, particularly when they contain iodine or bromine.

In order to determine the relative flammability of the cellulosic products, a simple flame test was employed as described by J. D. Reid et al. in Textile Research Journal, vol. 26, p. 137 (1956). In accordance with this test, strips of fabric 10 inches long and ¼ inch wide were held in a vertical position and a lighted match was applied to the lower end of the strips for a period of 5 seconds or until the material was ignited. The length of the strip which is burned before the flame extinguished itself was then noted. In some instances, strips 1½ inches in width were used and in other instances, the strip was held horizontally and the end of the strip ignited. In testing the flammability of loose fibrous materials such as cotton linters, the sample was placed on a piece of wire gauze and ignited from beneath by means of a match. In each case the period of after-glow was determined by timing the duration of any sparks or smoldering of the material after the flame was extinguished.

Those products having higher halogen content have greater flame retarding properties than those in which only limited substitution has been effected. In general it is preferable to treat the material so as to esterify every fourth or fifth unit in the cellulose chain and to effect substantially complete substitution with halogen. The weight increase or loading resulting from such treatment of the fabric should be in the neighborhood of 10%. If phosphorus is present in the molecule, only one phosphorus molecule for every twenty to forty units is necessary to insure effective resistance to after-glow. Such a limited amount of phosphorus results in negligible further increase in the weight of the fabric.

In order to illustrate typical procedure in accordance with the present invention, the following examples are cited.

EXAMPLE I

A sample of cotton oxford cloth (6 ounces per square yard) was first swollen to facilitate the esterification action by slack mercerizing in 20% aqueous solution of sodium hydroxide for a period of 15 minutes. The sample was then washed free of excess alkali and given an acetic acid sour followed by further washing with copious amounts of water to remove excess acid. The excess water was removed from the sample by partial drying at 50° C. and the sample then suspended in pyridine at room temperature. A mesylating solution was prepared by the addition of methanesulfonyl chloride to pyridine in quantity such that 3 moles of methanesulfonyl chloride to 1 mole of cellulose (based on the monomer weight of 162 for cellulose) would obtain in the mesylating reaction. The mesylating solution was then heated to 65° C., whereupon the cotton sample was removed from the first pyridine bath, squeezed out, and introduced into the warm reaction bath. A marked exothermic reaction takes place on contact of the sample with the methanesulfonyl chloride-pyridine solution. The system is not allowed to fall below about 62° C. and the reaction was allowed to proceed for a period of 5 to 10 minutes. At the end of this period the treated material was then removed, washed thoroughly with soap, rinsed with water and dried. The weight of the material before and after treatment was noted and it was found to have increased in weight by 9.0%.

EXAMPLE II

A sample of cotton sheeting (4.6 oz. per square yard) that had been mercerized in a commercial process by treating the cloth 30 seconds in sodium hydroxide solution (52° Tw.) was mesylated as follows. Sample was wet out in water and excess water removed by partial drying at 50° C. The sample was then suspended in pyridine at room temperature. A mesylating solution was prepared by the addition of methanesulfonyl chloride to pyridine in a quantity such that 3 moles of methanesulfonyl chloride to 1 mole of cellulose would be present after the introduction of the cotton fabric. The mesylating solution was then heated to 60° C., whereupon the sample was removed from the first pyridine bath, squeezed out, and introduced into the warm mesylating solution. The sample was allowed to react for 30 minutes and then removed, washed, dried and weighed. An increase of 14.2% in the weight of the sample was observed, as a result of mesylation.

EXAMPLE III

A sample of viscose rayon challis (about 3.6 oz. per square yard) was wet out in water and excess water removed by partial drying at 50° C. The sample was then suspended in pyridine at room temperature. Following the process cited in Example II, a mesylating solution (3:1 mole ratio) was prepared and the solution heated to 63° C. The rayon sample was removed from the first pyridine bath, squeezed out, and introduced into the warm mesylating solution. The sample was allowed to react for 6 minutes and then removed, washed, dried, and weighed. An increase of 9.0% in the weight of the sample was observed, as a result of mesylation.

Various samples treated in accordance with the present invention and under different conditions of time, temperature and concentration of the mesylating agent have been produced and analyzed as shown by the following table:

Table I

| Sample Description | Reaction Time, hrs.—mins. | Temperature, °C. | Mole Ratio, Reagent: Cell | Wt. Inc., percent | Sulfur, percent |
|---|---|---|---|---|---|
| Cotton Linters | 44—0 | Room | 6:1 | 60.4 | 16.4 |
| Cotton Oxford, 6-oz. | 48—0 | Room | 6:1 | 34.0 | 10.0 |
| Do | 4—0 | Room | 6:1 | 16.0 | 7.2 |
| Do | 8—40 | Room | 4.3:1 | 21.7 | 8.0 |
| Do | 2—50 | 47 | 3:1 | 10.4 | 5.8 |
| Do | 1—15 | 57 | 3:1 | 22.0 | (¹) |
| Cotton Sateen, 9-oz. | 1—15 | 55 | 3:1 | 17.5 | (¹) |
| Do | 0—52 | 55 | 3:1 | 13.0 | (¹) |
| Cotton Oxford, 6-oz. | 0—30 | 56 | 3:1 | 12.3 | (¹) |
| Do | 0—30 | 52 | 3:1 | 13.9 | (¹) |
| Do | 0—10 | 65 | 3:1 | 9.0 | (¹) |
| Do | 0—11 | 64 | 3:1 | 8.5 | (¹) |
| Do | 0—5 | 63 | 3:1 | 9.0 | (¹) |
| Do | 0—5 | 68 | 3:1 | 13.9 | (¹) |
| Viscose Rayon, 3.6-oz. | 0—15 | 60 | 3:1 | 15.2 | (¹) |
| Do | 0—6 | 63 | 3:1 | 9.0 | (¹) |
| Do | 0—5 | 60 | 3:1 | 8.3 | (¹) |
| Cotton Oxford, 6-oz. | 0—1 | 60 | 3:1 | 0.9 | (¹) |

¹ Not analyzed for sulfur content.

If it be assumed that esterification takes place only in the 6 position of the glucose anhydride unit, the maximum increase in weight of the treated product, upon complete esterification, would be 48.2% and would represent a theoretical maximum sulfur content of 13.3% by weight. It will be noted from the foregoing table that products subjected to prolonged treatment, using a mole ration of 6 to 1 of the methanesulfonyl chloride to cellulose, exceed the maximum weight represented by complete esterification in the 6 position. It is therefore believed that some of the hydroxyl groups in the 2 and 3 position were probably attacked and the labile hydrogens replaced by $SO_2CH_3$ groups.

The flame resisting characteristics of the products obtained as described above are improved but in no case was the product which had only been mesylated capable of withstanding the "match test" described above. The product in each instance was completely consumed when held in a vertical position and ignited. Nevertheless, the burning was slower and developed less flame than when the product was untreated. Furthermore, the char tends to shrink and curl in the vertical strip (¼" wide) test but is heavy and retains fabric structure. It is noteworthy that a wide vertical strip (1½" wide) test gives a good to excellent performance in the case of the modified fabric with a 21.7% or more increase in weight.

No sustained after-glow was found in any of the modified samples as a result of ignition. However, after-glow does occur when the charred material is subjected to prolonged contact with a flame. It is possible that the occurrence of after-glow on prolonged ignition may be due to the elimination of sulfur from the treated and charred material.

The flame resistance and after-glow of cellulose fabrics which have been esterified as described in Example I is not adequate for many purposes. It is therefore preferable to introduce a halogen to replace the $OSO_2CH_3$ group of the esterified material. This may be accomplished in an aqueous medium which permits the use of substantially any metal halide. Thus, fluorine, chlorine, bromine or iodine may be caused to replace some, or substantially all, of the ester groups. At the same time, since side reactions which cause degradation of the cellulose tend to occur during such substitution reactions, it is desirable to control the pH value of the aqueous medium and preferably of maintain the pH in the neighborhood of 7.

EXAMPLE IV

The product of Example I was suspended in a 20% aqueous solution of sodium iodide. Sufficient solid barium carbonate was added to the mixture to maintain the aqueous solution at about pH 7. The mixture was heated under reflux in a steam bath for a period of about three hours. The sample was then washed and dried and the weights of the samples before and after treatment were noted.

EXAMPLE V

The process of Example IV was repeated using other halogen salts, namely, sodium bromide, sodium chloride and sodium fluoride, although substantially any other water soluble metal or ammonium halide may be used. Further, the reaction may be carried out under varying conditions of concentration of the metallic halide and for varying periods of time.

If desired, the esterification and halogenation of the cellulose can be carried out simultaneously by the use of suitable reagents as indicated by the following example.

EXAMPLE VI

A sample of cotton oxford cloth (6 oz. per square yard) was swollen by slack mercerization in 20% aqueous sodium hydroxide for 15 minutes. The sample was washed free of excess alkali and given an acetic acid sour followed by washing with copious amounts of water to remove excess acid. The excess water was removed from the sample by partial drying at 50° C. The sample was then suspended in pyridine at room temperature. A reaction solution was prepared by dissolving a quantity of p-bromobenzenesulfonyl chloride in pyridine at room temperature and then heating the resultant solution to 60° C. The quantity of reagent was such that a 3:1 mole ratio (3 moles of p-bromobenzenesulfonyl chloride to 1 mole of cellulose) would obtain on introduction of the sample into the reaction solution. The cotton sample was removed from the first pyridine bath, squeezed out and introduced into the warm solution. The sample was allowed to react for 15 minutes, and then removed, washed, dried and weighed. An increase of 23.8% in the weight of the sample was observed as a result of the treatment.

The halogen contained in the products obtained in accordance with the foregoing examples may be detected by boiling a sample of the material in 1 N sodium hydroxide, after which the filtrate is acidified with 50% nitric acid and 5% silver nitrate is added to precipiate out the silver halide. The amount of halogen introduced into the cellulose molecule was quantitatively determined and the results obtained in various instances are indicated in the following table

Table II

| Sample Description | Halogen | Percent Halogen | Percent Sulfur |
|---|---|---|---|
| Cotton Oxford, 6-oz. | Bromine | 3.95 | 4.28 |
| Do | Iodine | 4.01 | 5.09 |
| Do | Chlorine | 1.45 | 4.82 |
| Do | Fluorine | 2.11 | 4.40 |
| Do | Bromine | 3.30 | 2.53 |
| Do | Iodine | 9.44 | 2.31 |
| Do | do | 8.02 | 2.83 |
| Do | Bromine | 3.65 | 4.01 |
| Cotton, Sateen, 9-oz. | do | 5.29 | 4.91 |
| Do | do | 3.39 | 4.13 |
| Do | do | 3.80 | 3.50 |

In general, the cellulose compounds containing iodine or bromine are more flame resistant than the corresponding chlorine and fluorine products as shown by the following table

Table III

| Fabric (6 oz./yd.²) | Derivative | Percent Halogen | Match Test Results | Rating |
|---|---|---|---|---|
| Cotton Oxford | Mesyl-6-iodo- | 4.01 | Passed | Excellent. |
| Do | Mesyl-6-bromo- | 3.95 | do | Good. |
| Do | Mesyl-6-chloro- | 1.45 | Fail | |
| Do | Mesyl-6-fluoro- | 2.11 | do | |

It should be noted that the products were subjected to the "match test" referred to above, which is a very rigid test. Less severe tests indicate that the chloro- and fluoroproducts possess greater flame resistance than the untreated fabrics.

Further tests upon the iodo- and bromo- forms of the product gave the results shown in the following table Table IV

| Percent Wt. Inc. | Derivative | Flame Held (Secs.) | Char Length (In.) |
|---|---|---|---|
| 7 | Bromo- | 2 | 2.2 |
| 7 | Bromo- | 4 | 5.3 |
| 11 | Iodo- | 2 | 0.5 |
| 11 | Iodo- | 4 | 1.8 |
| 12 | Bromo- | 6 | 2.5 |
| 15 | Iodo- | 6 | 2.0 |
| 31 | Iodo- | 6 | 1.8 |
| 24 | Iodo- | 6 | 1.8 |
| 22 | Bromo- | 6 | 3.3 |

It will be apparent from the foregoing tables that it is not necessary to increase the fabric weight by a large percentage in order to achieve effective flame resistance. Thus in prior methods wherein an additive type of flame retardant is applied to cellulose as an adhering agent, it is generally necessary to increase the weight of the product by at least 20% in order to attain effective results, whereas in accordance with the present invention, products which have an increase of weight not substantially exceeding 10% of the weight of the cellulose material treated, possess effective flame resistance.

When samples of 9 ounce sateen were mesylated and subsequently brominated, the following results were attained Table V

| Percent Wt. Inc. | Flame Held (Secs.) | Char Length (In.) |
|---|---|---|
| 19 | 4 | 1.5 |
| 19 | 7 | 2.8 |
| 19 | 6 | 1.0 |
| 18 | 6 | 1.4 |
| 18 | 10 | 2.0 |
| 14 | 6 | 2.8 |

In each of the foregoing samples and tests, methanesulfonyl chloride was employed. However, essentially the same results are attained when other organic sulfonyl halides are employed. In general, when using heavier organic sulfonyl chloride reagents, it is preferable to carry out the esterification reaction at lower temperatures.

EXAMPLE VII p-Toluenesulfonyl chloride was employed in accordance with the method of Example I using p-toluenesulfonyl chloride in the ratio of 3 moles of the reagent to 1 mole of the cellulose monomer in pyridine solution. The following results were obtained Table VI

| Reaction Time (hrs.) | ° C. Temperature | Percent Wt. Inc. |
|---|---|---|
| 6½ | Room | 8.3 |
| 2½ | 47 | 4.2 |
| 39 | 3 | 18.4 |

The flame retardant properties of the tosylated cotton fabric were somewhat inferior to those obtained when using methanesulfonyl chloride but indicated marked improvement over the untreated fabric.

Tests with regard to the tensile strength of cellulose treated in accordance with the present invention indicate that there is little or no reduction in their breaking strength and tear strength. The products show no decrease in their flame retarding properties when subjected to repeated washings with soap and with commercial detergents.

As pointed out in our copending application referred to above, the introduction of phosphorus into the cellulose molecule results in substantial elimination of afterglow, even when the charred material is subjected to prolonged ignition. Therefore, when it is important to suppress after-glow, the products of the present invention may be phosphorylated or subjected to other treatments for suppressing the persistance of smoldering or glowing after flame has been extinguished.

Mesylation or other esterification of cellulose materials may be carried out on mercerized cotton fabrics of all weights. The mercerization may be of the limited commercial variety or a prolonged treatment may be given. Unmercerized fabrics may also be modified to a lesser degree and fabrics which have merely been wetted out by brief immersion in water followed by drying can be used. The reaction can be performed on cotton linters, wood pulp, viscose rayon and upon other cellulosic materials. Fabrics containing mixed fibers such as cotton and wool may also be treated in accordance with the present invention.

The material is preferably wetted out with water and the excess water removed, followed by soaking in pyridine, as a pre-treatment. Mesylation may be carried out by using initial bath temperatures of from 0 to 70° C. for periods ranging from 1 minute to as long as desired. 48 hours is not a maximum. When the initial bath temperature is above 70° C., the increase in temperature of the bath due to the exothermic nature of the reaction may be sufficient to require cooling since the methanesulfonyl chloride-pyridine appears to be unstable and ineffective if its temperature is permitted to rise without control. A maximum bath temperature of about 80° C. is permissible, whereas an initial bath temperature of about 62 to 65° C. and a maximum bath temperature of about 75° C. is preferred.

The concentration of methanesulfonyl chloride is related to the quantity of the sample to be mesylated. Mole ratios of methanesulfonyl chloride to cellulose ranging from 1:1 to 8:1 have been used successfully. The preferred procedure involves treatment of the cellulosic material for a period of from 5 to 10 minutes using 3 moles of organic sulfonyl chloride to 1 mole of cellulose.

The introduction of the halogen into the cellulose units by replacement of the ester group or otherwise takes place in the 6 position according to the Oldham and Rutherford rule and is effected readily in aqueous solution, preferably at elevated temperatures up to that of refluxing. The concentration of the halogen salt in the solution may vary from dilute to concentrated solution and the pH value is preferably kept about 7 although it may vary considerably within the range of pH 5 to pH 9 depending upon the duration and temperature of the treatment. The halogenation reaction may be continued for a period of from 5 minutes to 6 or 8 hours depending upon the degree of substitution desired, the concentration of the solution and the temperature at which the reaction is carried out. Ordinarily treatment at refluxing temperatures for a period of about 3 hours, when using a relatively concentrated solution, will suffice to replace most of the ester groups with halogen. There always appear to be some ester groups remaining in mesylated cellulose after halogenation treatment as indicated by the presence of at least some sulfur in the final product even after prolonged treatment at elevated temperatures. On the other hand, even with very limited replacement of the ester groups by iodine or bromine, the flame resistant properties of mesylated cellulose are improved.

The mesylated fabric or other cellulosic material may vary considerably in chemical composition in that it may contain from about 0.5 to 20% of sulfur, although the preferred sulfur content is less than 10%. In a similar way, the composition of the mesyl-6-halo-cellulose derivatives will vary with the nature of the cellulosic material employed and the manner in which it is treated. The sulfur content of such derivatives may vary from about 0.5 to 15% but is preferably relatively low, that is, less than about 5%. The weight of the halogen in the derivative will depend somewhat upon the particular halogen employed and may vary from about 1 to 20% but is preferably in the range of from about 2 to 8% by weight. When phosphorus is present in the product, it is ordinarily used in such limited amount that no appreciable weight increase is observed. The total loading of the product, therefore, seldom need be more than about 15% and may be as low as 5% or even less.

While the products in some instances undergo a certain amount of darkening as a result of the treatments to which they have been subjected, dyeing of the material is not greatly affected and materials which were dyed prior to treatment in accordance with the present invention have shown but little variation in color. The treatment of the present invention does not appear to affect the dyeing properties of the esterified and halogenated cellulose. Similarly, the material may be subjected to any of the conventional textile finishing treatment to increase the hand, resistance to creasing, and the shrinking characteristics of the material. Thus the physical properties of the cellulose compounds of the present invention differ but little from those of cellulose itself.

While various preferred methods of procedure and reagents have been referred to in the description and examples cited above, the methods of the present invention are capable of wide variation in effecting the selective esterification and the halogenation of cellulose. The reactions may be carried out so as to introduce different halogens simultaneously into the cellulose molecule and thus, mixed reagents may be employed in carrying out both the esterification and halogenation steps of the process. Furthermore, the process is capable of application to substantially any cellulose containing material and, therefore, may be applied to mixed fabrics and to various types of paper and paper making materials.

In view of such possible variations, it should be understood that the specific embodiments of the invention described above are intended to be illustrative only and are not intended to limit the scope of the invention.

We claim:

1. The method of treating cellulose material which comprises contacting said material with a bath containing pyridine and an organic sulfonyl chloride the initial temperature of the bath being below 70° C., keeping the material immersed for a period of from about 1 minute to 48 hours, and thereafter contacting the treated material with an aqueous solution of a halide having a pH value of from about 5 to 9.

2. The method of treating cellulose material which comprises contacting said material with an organic sulfonyl chloride in the presence of pyridine at an initial bath temperature below 70° C. for a period of from about 1 minute to 48 hours and thereafter contacting the treated material with a metallic halide in an aqueous solution maintained at a pH value of about 7.

3. The method of producing a cellulose derivative which has flame retardant properties which comprises immersing mercerized cellulose in a pyridine solution of an organic sulfonyl chloride containing from 1 to 8 moles of said chloride for each mole of the cellulose based upon a monomer weight of 162 for cellulose, and maintaining the cellulose in said solution for from about 1 minute to 48 hours, the initial temperature of the bath being below 70° C., thereafter immersing the resulting cellulosic material in an aqueous solution of a metal halide and maintaining said solution at a pH value of from about 5 to 9.

4. The method of producing a cellulose derivative which has flame retardant properties which comprises immersing mercerized cellulose in a pyridine solution of an organic sulfonyl chloride containing from 1 to 8 moles of said chloride for each mole of the cellulose based upon a monomer weight of 162 for cellulose, and maintaining the cellulose in said solution for from about 1 minute to 48 hours, while keeping the temperature of the solution below 80° C., thereafter immersing the resulting cellulosic material in an aqueous solution of a metal halide and heating to refluxing temperature while maintaining the solution at a pH value of from about 5 to 9.

5. A cellulose derivative having flame retardant properties and having halogen and mesyl groups chemically combined with the glucose anhydride units of the cellulose molecule, the halogen being present in amount equal to from about 1 to 20% by weight of the product and sulfur being present in amount equal to from about 0.5 to 15% by weight of the product.

6. Cellulose having some of the glucose anhydride units substituted in the 6 position with iodine and having some of said units substituted in the secondary hydroxyl positions with mesyl groups the product containing from about 1 to 20% by weight of iodine and from about 0.5 to 15% by weight of sulfur.

7. Cellulose having some of the glucose anhydride units substituted in the 6 position with bromine and having some of said units substituted in the secondary hydroxyl positions with mesyl groups the product containing from about 1 to 20% by weight of bromine and from about 0.5 to 15% by weight of sulfur..

8. A modified cellulose wherein some of the glucose anhydride units may be represented by the group

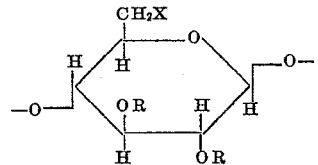

wherein X is halogen and R is selected from the group consisting of hydrogen and organic sulfonyl radicals and when both of the R's in said unit are hydrogen some other glucose anhydride units in the cellulose macromolecule contain organic sulfonyl radicals the modified cellulose containing from about 1 to 20% by weight of halogen and from about 0.5 to 15% by weight of sulfur.

9. The method of producing a cellulose derivative which is characterized by its flame resistant properties which comprises the step of refluxing mesylated cellulose with an aqueous solution of a metal halide for a period of from about 5 minutes to 8 hours.

10. The method of producing a cellulose derivative which is characterized by its flame resistant properties which comprises the step of refluxing mesylated cellulose with an aqueous solution having a pH in the range of 5 to 9 and containing a metal halide for a period of from about 5 minutes to 8 hours.

References Cited in the file of this patent

UNITED STATES PATENTS

| 2,033,787 | Rigby | Mar. 10, 1936 |
| 2,138,778 | Rigby | Nov. 29, 1938 |
| 2,401,440 | Thomas | June 4, 1946 |
| 2,697,093 | Jones | Dec. 14, 1954 |
| 2,743,232 | Chance | Apr. 24, 1956 |

OTHER REFERENCES

Wolfrom et al.: J.A.C.S., vol. 63 (1941), pp. 1688–1691.

Cramer et al.: J.A.C.S., vol. 61, 1930, p. 3458.

Pigman et al.: "Chemistry of the Carbohydrates," 1948, Academic Press Inc., publ., N.Y.C., pp. 170, 171, 262, 389, 549, 554 and 593.

Little: "Fame Proofing Textile Fabrics," Reinhold Publ. Corp., 1947, pp. 172 and 173.